(12) United States Patent
Biswas et al.

(10) Patent No.: US 12,045,815 B2
(45) Date of Patent: Jul. 23, 2024

(54) MOBILE DEVICE TRANSACTION CREDENTIAL LENDING

(71) Applicant: American Express Travel Related Services Company, Inc., New York, NY (US)

(72) Inventors: Manik Biswas, Burgess Hill (GB); Mukund Shankar SimhaRaghu, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 87 days.

(21) Appl. No.: 17/539,380

(22) Filed: Dec. 1, 2021

(65) Prior Publication Data

US 2023/0169501 A1    Jun. 1, 2023

(51) Int. Cl.
*G06Q 20/40*    (2012.01)
*G06Q 20/32*    (2012.01)
*H04W 12/04*    (2021.01)

(52) U.S. Cl.
CPC ......... *G06Q 20/401* (2013.01); *G06Q 20/322* (2013.01); *H04W 12/04* (2013.01)

(58) Field of Classification Search
CPC .................................................. G06Q 20/401
See application file for complete search history.

(56) References Cited

U.S. PATENT DOCUMENTS

| | | | |
|---|---|---|---|
| 2008/0208743 A1* | 8/2008 | Arthur | G06Q 40/00 705/41 |
| 2017/0337549 A1* | 11/2017 | Wong | G06F 21/6263 |
| 2019/0087814 A1 | 3/2019 | Lassouaou et al. | |
| 2020/0167753 A1 | 5/2020 | Arora et al. | |
| 2021/0081911 A1* | 3/2021 | Samid | G06Q 20/327 |
| 2021/0295335 A1 | 9/2021 | Long et al. | |

FOREIGN PATENT DOCUMENTS

| | | |
|---|---|---|
| JP | 2020197977 A | 12/2020 |
| KR | 20180019940 A | 2/2018 |

\* cited by examiner

*Primary Examiner* — Arunava Chakravarti
(74) *Attorney, Agent, or Firm* — Thomas | Horstemeyer, LLP (57) ABSTRACT

System and methods are described for enabling a first client device to authorize a second client device to use a payment token for contactless payments, in which the payment token is authorized to be used by the second device with restrictions set by the first device. In one embodiment, a system comprises a computing device that includes a secure element. The system also includes machine-readable instructions that, when executed by the processor, cause the computing device to at least receive an indication for generating a sub-payment token and receive a selection of a key restriction for the sub-payment token. An application stored in the secure element is called to generate the sub-payment token based on the key restriction. The sub-payment token is received and comprises a sub-payment key and an application transaction counter range. The sub-payment token is sent through the wireless communication session to a second computing device.

20 Claims, 8 Drawing Sheets

FIG. 5

MOBILE DEVICE TRANSACTION CREDENTIAL LENDING

BACKGROUND

An individual may desire to lend or give money to others for a variety of reasons, such as to provide financial assistance, to enable someone to make a purchase on their behalf, or for other suitable reasons. In some instances, the individual may choose to provide the other individual with cash. In other instances, the individual may choose to lend a payment instrument (e.g., a credit card, a debit card, a gift card, etc.) to the other individual for a limited time period. With these options, the individual has little or no control over the spending behavior of the other individual.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to enabling a first device to lend a payment token (e.g., a token associated with a payment instrument) to a second device for contactless payments or other device-based payments. The first device can configure the lend payment token in such a way to have restrictions in place to limit the use of the payment token by a second user with the second device. Thus, the embodiments relate to enabling a first client device to generate a sub-payment token for use by a second client device without the involvement of a backend server. The sub-payment token can be communicated directly from the first client device to a second client device. The sub-payment token can be generated with restrictions set by the first client device in a real-time or near real-time manner. Accordingly, the embodiments provide a faster, more secure manner for lending a payment credential from a first device to a second device.

Contactless payments have become another viable payment technique at contactless-equipped point of sale terminals. In a typical contactless payment scenario, the mobile device (e.g., that has a payment token for a transaction account) and the interrogating device (e.g., a point of sale device) agree on a mode of payment. Based on the mode of payment, an application cryptogram is generated by the mobile device. The application cryptogram can be used by the interrogating device to get an authorization from its issuer. The application cryptogram can provide at a minimum two assurances: 1) the mobile device has the account specific secret key (ASSK) (e.g., a payment key) which is generated/managed by the issuer; and 2) the mobile device is the entity which has locally authenticated the payment by generating the application cryptogram using transaction specific data.

In some cases, the ASSK is treated as a highly sensitive data element and is managed with strong security controls. Traditionally, hardware security modules are used to manage the lifecycle of these keys. The lifetime of these keys is issuer defined and can range from minutes to years depending on issuer product requirements.

Apart from the application cryptogram, the mobile device and the interrogating device can exchange multiple other data elements which are required for settling the transaction. Some non-limiting examples include permanent account number (PAN), an expiry date, Processing Data Object List etc. These elements are generated/managed by the issuer depending on their product requirements.

Various embodiments of the present disclosure improve the field of contactless payments by enabling a first device to securely lend to a second device a token (e.g., a payment instrument) that can be used for contactless payments with user-selected restrictions. For example, the ASSK (e.g., a payment key) mentioned previously is generally generated or derived by the issuer before being transferred to the mobile device of the account holder user. Generally, the account holder user has no ability to extract it or pass it to someone else because of the security controls enforced by a secure element. This limits the possibility for an account holder user who would like to lend his/her payment card to someone else for a short duration, but with adequate security and restrictions. The embodiments can use a payment key of the account holder user to derive a sub-payment key that can be provided to another device.

In some embodiments, the mobile device holding the payment key (e.g., ASSK) will derive a session-based sub-payment key (e.g., Account Specific Sub Secret Key (AS-SSK)) which can be set to be valid for a limited number of transactions defined by the mobile device. As such, the mobile device can send the sub-payment key and other associated data to another recipient, which can enable the recipient to make regular contactless payments at POS terminals or regular online purchases. In some embodiments, additional risk parameters, like a cumulative total transaction amount, a single transaction value limit, and others, can be added to this sub-payment key as required by the issuer. Although the following discussion provides illustrative examples of the operation of various components of the present disclosure, the use of the following illustrative examples does not exclude other implementations that are consistent with the principals disclosed by the following illustrative examples.

Figure 1A:
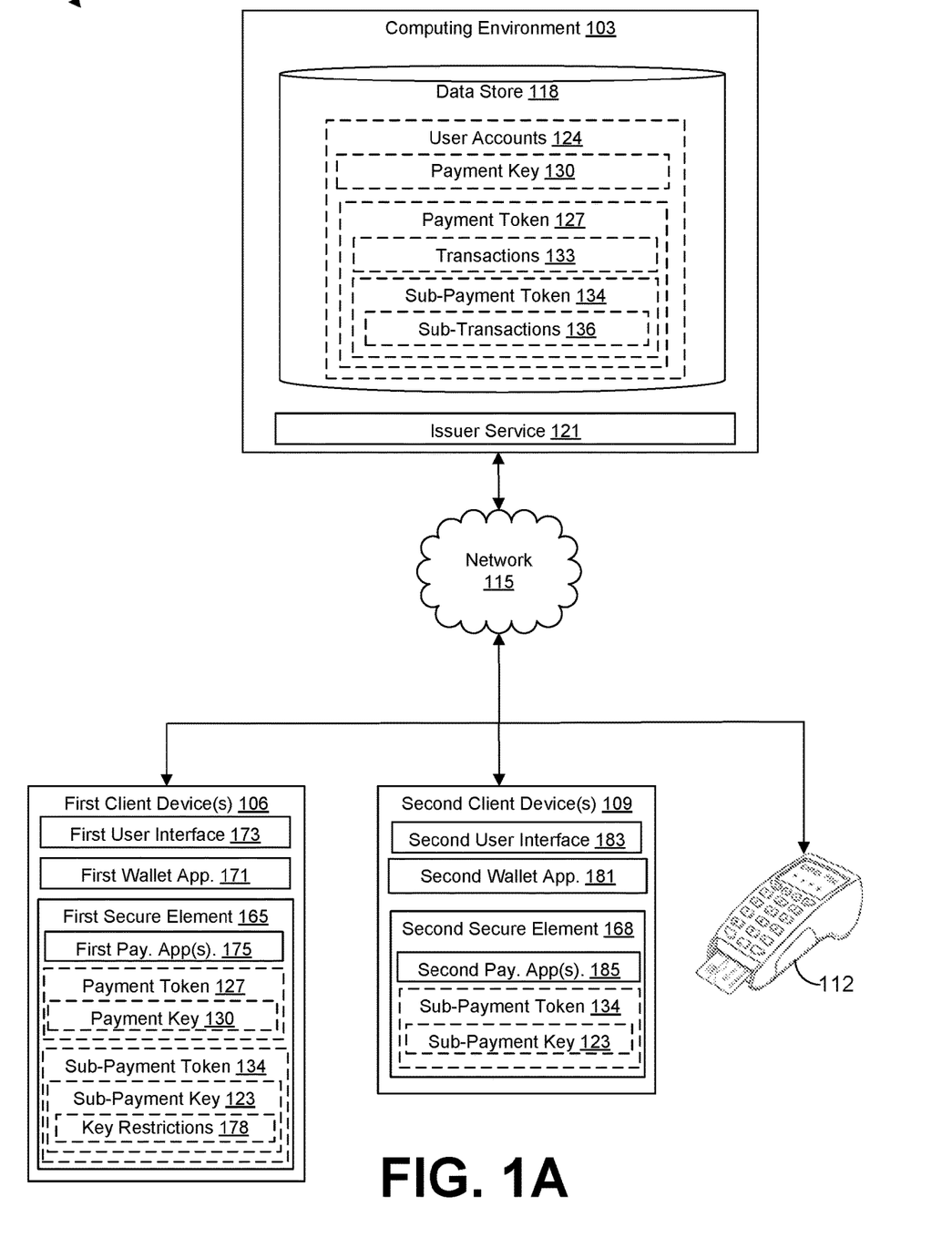
FIG. 1A is a drawing of a networked environment according to various embodiments of the present disclosure.

With reference to FIG. 1A, shown is a networked environment 100 according to various embodiments. The networked environment 100 includes a computing environment 103, a first client device 106, a second client device 109, and a point of sale (POS) terminal 112, which are in data communication with each other via a network 115. The network 115 includes, for example, the Internet, intranets, extranets, wide area networks (WANs), local area networks (LANs), wired networks, wireless networks, peer-to-peer networks, or other suitable networks, etc., or any combination of two or more such networks. For example, such networks may comprise satellite networks, cable networks, Ethernet networks, and other types of networks. The network 115 can be represent multiple networks and devices connected to the network 115 can be in data communication with other devices connected to the network 115.

The computing environment 103 can include a server computer or any other system providing computing capability. Alternatively, the computing environment 103 may employ a plurality of computing devices that may be arranged, for example, in one or more server banks, one or more computer banks or in other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 118 that is accessible to the computing environment 103. The data store 118 may be representative of a plurality of data stores 118 as can be appreciated. The data stored in the data store 118, for example, is associated with the operation of the various applications and/or functional entities described below.

The components executed on the computing environment 103, for example, include an issuer service 121, and other applications, services, processes, systems, engines, or functionality not discussed in detail herein. The issuer service 121 can be executed to determine whether to authorize transaction requests from POS terminals 112. The issuer service 121 can identify and authorize transaction requests that used a sub-payment key 123. The issuer service 121 can enforce transaction restrictions that are associated with the sub-payment key 123, the transaction restrictions being set by the account holder.

The data stored in the data store 118 includes, for example, user accounts 124 for financial account holders at a financial institution and potentially other data. The user account 124 can include payment token 127, a payment key 130 associated with a financial account, and/or potentially other data.

The payment token 127 can represent a financial account number such as a credit card, a debit cart, a gift card, a wallet application, and/or other suitable financial instruments. The payment token 127 can include transactions 133 and a sub-payment token 134. The transactions 133 can represent financial transactions performed by the account holder of the user account 124.

The sub-payment token 134 can represent a token or a particular payment instrument that is generated and controlled by the account holder of the user account 124. The sub-payment token 134 can be subordinate to the payment token 127. The sub-payment token 134 can be linked to a sub-payment key 123 for authorizing sub-transactions 136 performed by the second user. The sub-payment token 134 can be provided to a second user with restrictions in order to provide financial assistance, to enable the second user to make a purchase on behalf of the account holder, and/or for other financial circumstances. The sub-payment token 134 can be generated by the first client device 106 of the account holder. The sub-transactions 136 can represent financial transaction made by the second user.

The payment key 130 can represent a key that is generated or managed by an issuer system of a financial entity. The payment key 130 can be used for validating transactions 133 that are conducted by a mobile device (e.g., contactless payments at POS terminal or online transactions performed by the first client device 106). When an application cryptogram is provided to an interrogating device, the payment key 130 is provided as a security mechanism. One non-limiting example of payment key 130 is an Account Specific Secret Key. The payment key 130 can be treated as a highly sensitive data element and, accordingly, can be managed with strong security controls. For example, the payment key 130 can be stored in hardware security modules, in which access is granted after authentication. As another example, the Account Specific Secret Key (e.g., a payment key 130) cannot be extracted and transferred to another user. The hardware security modules can be used to manage the lifecycle of payment keys 130. The lifetime of these payment keys 130 is issuer defined and can range from minutes to years depending on the issuer product requirements.

The first client device 106 and the second client device 109 are representative of a plurality of client devices that may be coupled to the network 115. The first client device 106 and the second client device 109 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The first client device 106 and the second client device 109 may include a display. The display may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The first client device 106 and the second client device 109 can have a first secure element 165 and the second secure element 168, respectively. The first secure element 165 and the second secure element 168 can be implemented as a hardware component, as a software component, or a combination of hardware and software. The first secure element 165 and the second secure element 168 can execute a limited set of restricted applications, as well as store confidential payment information, identity credentials, cryptographic data, and/or potentially other confidential data. In some embodiments, the first secure element 165 and the second secure element 168 comprise a computing device that is tamper resistant, in which the computing device includes a processor and memory. In some instances, the hardware and/or software components used to implement a secure element are certified by a security standards body, such as GlobalPlatform®.

The first client device 106 can be used by an account holder of a user account 124. The first client device 106 may be configured to execute various applications such as a first wallet application 171 and/or other applications. The first wallet application 171 can be executed to provide payment information (e.g., a payment token 127) for executing a transaction and can be executed to generate sub-payment keys 123 for lending to other individuals. The first wallet application 171 may also be executed in a first client device 106, for example, to access network content served up by the computing environment 103 and/or other servers, thereby rendering a first user interface 173 on the display. To this end, the first wallet application 171 may comprise, for example, a browser, a dedicated application, etc., and the user interface 173 may comprise a network page, an application screen, etc. The first client device 106 may be configured to execute applications beyond the first wallet application 171 such as, for example, email applications, social networking applications, word processors, spreadsheets, and/or other applications.

The first secure element 165 can include a first payment application 175 for generating sub-payment keys 123 to be used by authorized users selected by the account holder of a user account 124. The first secure element 165 can store the payment token 127, the payment key 130, the sub-payment token 134, the sub-payment key 123, and other potential data. The sub-payment key 123 are associated with one or more key restrictions 178 set by the account holder of the user account 124.

The first payment application 175 can represent one or more applications that are executed on the first secure element 165. For example, the first payment application 175 can include a payment applet that is executed to facilitate transactions by providing a payment key 130 or is executed to generate a sub-payment key 123.

The sub-payment key 123 can represent a key that is subordinate to the payment key 130. The sub-payment key 123 can be generated by the account holder of the user account 124 in order to provide a mechanism for the account holder to lend a payment token 127 (e.g., a payment instrument such as a credit, charge, debit, or gift card) to another individual. The other individual can use the token on the second client device 109 to make purchases in a variety of manners, such as by way of near field communication taps, online purchases, quick response code purchases, and other suitable contactless purchases with a device.

The sub-payment key 123 can be generated by the first secure element 165 in the first client device 106. The sub-payment key 123 can be derived from the payment key 130 and can include various parameters that indicate key restrictions 178 that have been set for the account holder of the user account 124. In some examples, the sub-payment key 123 includes the payment key 130, an application transaction counter range, a sub-ATC, restriction parameters (e.g., key restrictions 178), and other suitable data elements. In some implementations, the sub-payment key 123 can be an Account Specific Secret Sub Key.

The key restrictions 178 can represent one or more transaction restrictions for the sub-payment key 123 that are selected by the account holder from the first client device 106. Some non-limiting examples of key restrictions 178 include a quantity of authorized transactions (e.g., five permitted transactions), a period of time (e.g., a week period of time, a month, six months) for using the sub-payment key 123, a transaction category (e.g., airfare, car rental, food, housing, retail, education), a transaction amount limit (e.g., the purchases cannot exceed $100), a restriction location (e.g., purchases permitted within the city of Chicago), and other suitable transaction restrictions. In some embodiments, the key restrictions 178 can be enforced by the issuer service 121. The issuer service 121 can determine whether to approve or decline transaction requests based on the key restrictions 178 set for the sub-payment key 123 and the transaction data associated with a transaction request. For example, the issuer service 121 can enforce the key restrictions 178 by comparing the transaction data (e.g., a transaction amount, a transaction location, a transaction category type, a participating merchant, transaction time and date, etc.) to parameters set as key restrictions 123 in the sub-payment key 123. As such, upon receiving the sub-payment key 123, the issuer service 121 can review the parameters set as key restrictions 178 and compare those parameters to the transaction data for compliance.

If the transaction data does not comply with the key restrictions 178, the issuer service 121 can notify the POS terminal 112 that the transaction has been declined. For example, the sub-payment key 123 may have a key restriction 178 that transactions cannot exceed $100. This key restriction 178 can be included as a parameter in the sub-payment key 123. When the transaction request is submitted to the issuer service 121, the sub-payment key 123 and the transaction data are also submitted to the issuer service 121. If the transaction data indicates that the transaction is for a purchase of an item that cost $200, the issuer service 121 can compare the $200 cost to the $100 limit set by the key restriction 178. Thus, the issuer service 121 can notify the POS terminal 112 that the transaction is declined.

The second client device 109 can be used by another individual that is receiving the sub-payment key 123 from the account holder of the user account 124. The second client device 109 may be configured to execute various applications such as a second wallet application 181 and/or other applications. The second wallet application 181 can be executed to provide payment information during a transaction to a POS terminal 112. In some embodiments, the second wallet application 181 can be executed to receive a sub-payment keys 123 sent from the first client device 106 and to provide the sub-payment key 123 to the POS terminal 112 during a contactless transaction. The second wallet application 181 may also be executed in a second client device 109, for example, to access network content served up by the computing environment 103 and/or other servers, thereby rendering a second user interface 183 on the display. To this end, the second wallet application 181 may include, for example, a browser, a dedicated application, etc., and the second user interface 183 may comprise a network page, an application screen, etc. The second client device 109 may be configured to execute applications beyond the second wallet application 181 such as, for example, email applications, social networking applications, word processors, spreadsheets, and/or other applications.

Similar to the first secure element 165, the second secure element 168 can include a second payment application 185 and the sub-payment key 123 received from the first client device 106. The second secure element 168 can store the sub-payment token 134, the sub-payment key 123, and other potential data. The second payment application 185 can be similar in functionality as the first payment application 175.

Figure 1B:
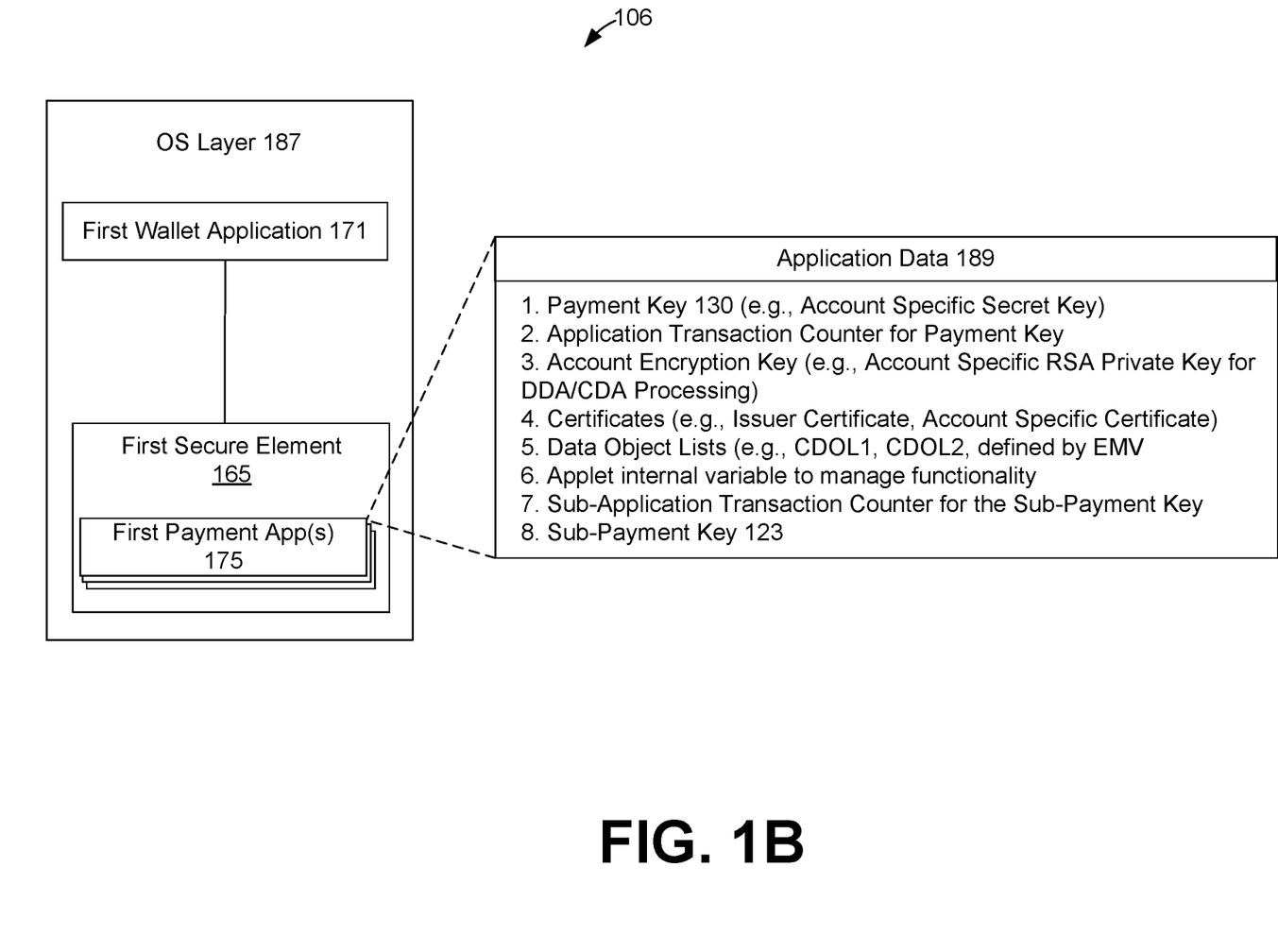
FIG. 1B is a drawing of an operating system layer of the first client device in the networked environment of FIG. 1A according to various embodiments of the present disclosure.

Next, FIG. 1B illustrates that the first client device 106 has an operating system layer 187. The operating system layer 187 can be system software that manages computing hardware and software resources. A similar operating system layer 187 can be implemented in the second client device 109. In some embodiments, the operating system layer 187 can have an application programming interface that enables the first wallet application 171 to communicate with the first secure element 165. Additionally, the first secure element 165 can include one or more first payment applications 175. In some examples, a first payment application 175 can represent a payment applet that is executed to provide payment information (e.g., the payment key 130, the sub-payment key 123 and/or other data) to the first wallet application 171, in which the first wallet application 171 can relay the payment information to the POS terminal 112.

The first payment application 175 can include application data 189. The application data 189 can include data elements, such as a payment key 130 (e.g., an account specific secret key), an application transaction counter, an account encryption key (e.g., an account specific Rivest-Shamir-Adleman (RSA) private key for Dynamic Data Authentication (DDA)/Combined DDA (CDA) processing. certificates (e.g., Europay, Mastercard, and Visa (EMV) certificates), Data Object Lists, Applet variables for managing functionality, the sub-payment key 123, a sub-application transaction counter (sub-ATC) for the sub-payment key 123, and other potential data.

The sub-ATC can maintain a count of a quantity of transactions completed using the sub-payment key 123. Thus, the sub-ATC can be incremented after every completed transaction using the sub-payment key 123. As such, the transaction performed by the account holder with the payment key 130 does not interfere with a quantity of transactions permitted for the sub-payment key 123 because the sub-payment key 123 has a separate transaction counter. The sub-ATC can be used to enforce that the quantity of permitted transaction for the sub-payment key 123. Upon receiving a transaction request, the issuer service 121 can review the sub-ATC and an ATC range for the sub-payment key 123. If the sub-ATC is beyond the ATC range for the sub-payment key 123, then the issuer service 121 will decline the transaction. Additionally, as was described, the sub-ATC and the sub-payment key 123 are generated when the first wallet application 171 provides a request to the first payment application 175 for a sub-payment token 134.

Next, a general description of the operation of the various components of the networked environment 100 is provided. To begin, a first user (e.g., the account holder) of the user account 124 can use the first client device 106 to lend a payment token 127 (e.g., a credit, charge, debit, or gift card) to a second user. The first user can use the first wallet application 171 to indicate a request to generate a sub-payment token 134 that is subordinate to the payment token 127 of the first user. From the first wallet application 171, the first user can select or specify a quantity of permitted transactions (e.g., a key restriction 178) for the second user. The first wallet application 171 can call the first payment application 175 to generate a sub-payment key 123 and a sub-payment token 134. The first payment application 175 can generate an application transaction counter (ATC) range based on the quantity of permitted transactions. Then, the sub-payment key 123 can be generated based on the payment key 130, the ATC range, and other potential data.

Afterward, the first payment application 175 can return a sub-payment token 134 that includes the sub-payment key 123.

Afterwards, the first wallet application 171 can identify the network address (e.g., an email address) or a device identifier (e.g., a phone number) of the second client device 109 (e.g., from a contact list stored in the first client device 106 or from input provided by a user interface). The first wallet application 171 can send the sub-payment token 134 to the second client device 109 by way of a peer-to-peer communication protocol or by the network 115. Thus, the first client device 106 can generate a sub-payment token 134 and transmit the sub-payment token 134 to the second client device 109 without the involvement of the issuer service 121, which is associated with a financial transaction account provider.

After receiving the sub-payment token 134, the second client device 109 can validate the sub-payment token 134 using a cryptographic key. Then, the second wallet application 181 can select a second payment application 185, from the second secure element 168, for initiating an authentication process. After authentication, the second payment application 185 can process and store the sub-payment token 134 in the second secure element 168.

The second user can use the second client device 109 to make a contactless payment using the sub-payment key 123 at a POS terminal 112. The POS terminal 112 can transmit a transaction authorization request to the issuer service 121. The issuer service 121 can identify that the transaction authorization request includes a sub-payment key 123. The issuer service 121 can also identify that the payment key 130 is linked to the sub-payment key 123. The issuer service 121 can approve or decline the transaction authorization request based on the key restrictions 178, the sub-ATC for the sub-payment key 123, the transaction data for the transaction, and other risk rules.

Figure 2A:
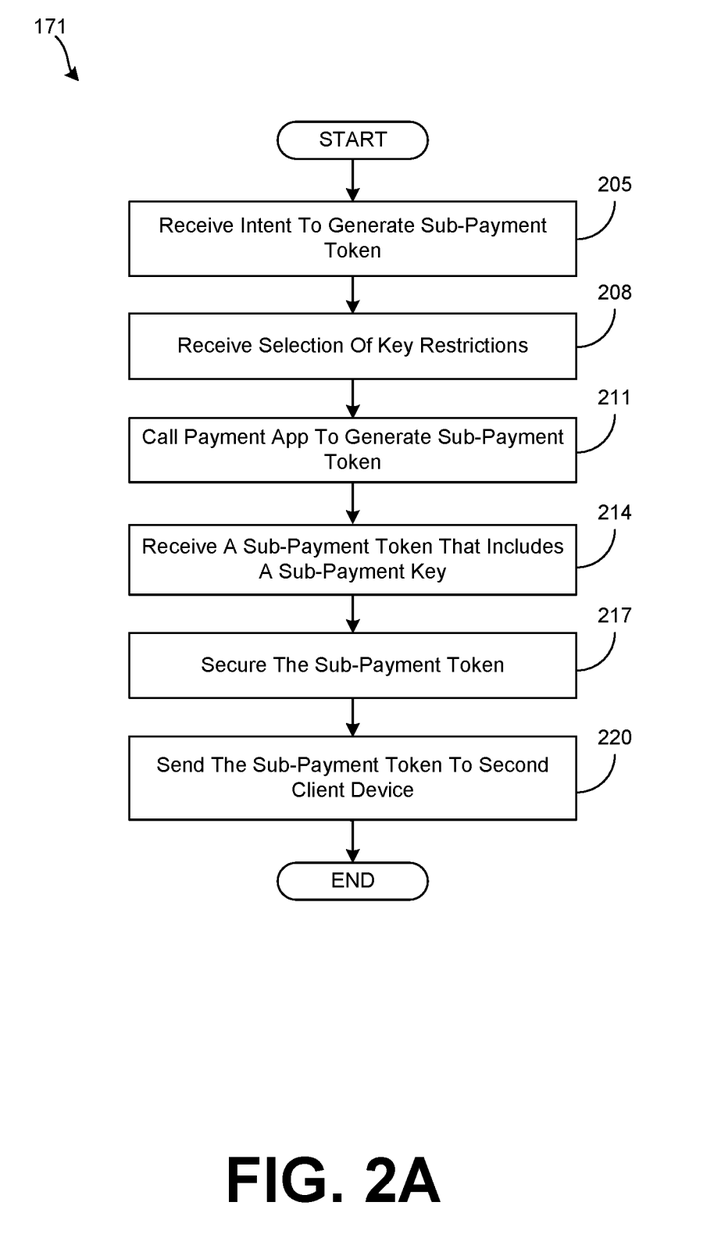
FIG. 2A is a flowchart illustrating one example of functionality implemented as portions of a first wallet application executed in a computing environment in the networked environment of FIG. 1A according to various embodiments of the present disclosure.

Referring next to FIG. 2A, shown is a flowchart that provides one example of the operation of a portion of the first wallet application 171 according to various embodiments. It is understood that the flowchart of FIG. 2A provides merely an example of the many different types of functional arrangements that may be employed to implement the operation of the portion of the first wallet application 171 as described herein. As an alternative, the flowchart of FIG. 2A may be viewed as depicting an example of elements of a method implemented in the first client device 106 or the second client device 109 (FIG. 1A) according to one or more embodiments.

Beginning with box 205, the first wallet application 171 can receive an intent or an indication to generate a sub-payment token 134 that authorizes another user to make transactions associated with the user account 124. For example, the first user, as an account holder of a user account 124, can desire to lend their payment token 127 to a second user. In some embodiments, the first wallet application 171 can render a first user interface 173 in which a first user (e.g., an account holder) can select a user interface component for initiating the lending of a payment token 127.

In box 208, the first wallet application 171 can receive a selection of a quantity of transactions permitted for lending the payment token 127. The first wallet application 171 can update the first user interface 173 to include user interface components or data fields for receiving various key restrictions 178. For example, in addition to the quantity of permitted transactions, the first user interface 173 can receive other key restrictions 178, such as a transaction value limit, a period of time in which the sub-payment token 134 is valid, a category spending restriction, a location restriction for transactions, and/or other suitable key restrictions 178.

In box 211, the first wallet application 171 can call the first payment application 175 to generate a sub-payment token 134 (e.g., a sub-payment key 123). The first wallet application 171 can provide the first payment application 175 with the key restrictions 178 (e.g., the quantity of permitted transactions). In some embodiments, the first payment application 175 is executed on the first secure element 165. As a result, the first wallet application 171, in some embodiments, can provide credentials for authentication.

In box 214, the first wallet application 171 can receive the sub-payment token 127, in which the lending payment token 127 includes the sub-payment key 123. The sub-payment key 123 can be derived from the payment key 130 stored in the first client device 106. The sub-payment key 123 can also include one or more key restrictions 178. The sub-payment key 123 can include as a parameter an application transaction counter (ATC) range that indicates the quantity of permitted transactions selected by the account holder. For example, if the sub-ATC associated with the sub-payment key 123 is at 0x0005 and three new transactions were permitted, then the ATC range would be 0x0006-0x0008.

In box 217, the first wallet application 171 can secure the sub-payment token 134 by using an encryption scheme. In some embodiments, the encryption may be omitted by the first wallet application 171. Instead, in some embodiments, the first payment application 175 may encrypt the sub-payment token 134 before returning it to the first wallet application 171.

In box 220, the first wallet application 171 can send the sub-payment token 134 to the second client device 109. The first wallet application 171 can display the first user interface 173 for selecting a contact recipient in a contact list. Alternatively, the first user interface 173 can be configured for receiving the contact information (e.g., a network address or a mobile device identifier) of the second client device associated 109 with the recipient. After the contact information is identified (e.g., from the contact list or from the user interface), the first wallet application 171 can transmit the sub-payment token 134 to the second client device 109. In some embodiments, the first wallet application 171 can use a peer-to-peer messaging protocol, such as a Bluetooth protocol, an NFC protocol, a wireless local area network, or other suitable wireless protocols.

In other embodiments, the first wallet application 171 can use other communication protocols such as a text message protocol (e.g., SMS, MMS, etc.), an email protocol, a chat message application, or other suitable communication protocols. Then, the first wallet application 171 can proceed to completion.

Figure 2B:
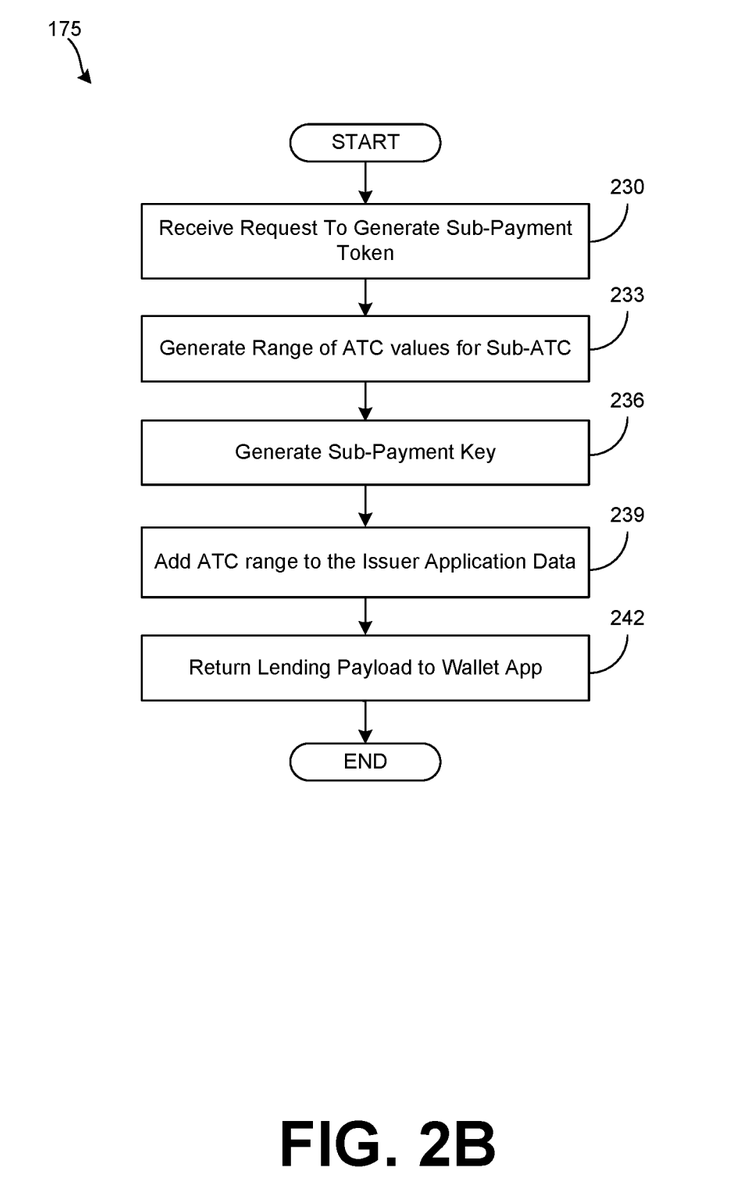
FIG. 2B is a flowchart illustrating one example of functionality implemented as portions of a first payment application executed in a computing environment in the networked environment of FIG. 1A according to various embodiments of the present disclosure.

Moving on to FIG. 2B, shown is a flowchart that provides one example of the operation of a portion of the first payment application 175 according to various embodiments. It is understood that the flowchart of FIG. 2B provides merely an example of the many different types of functional arrangements that may be employed to implement the operation of the portion of the first payment application 175 as described herein. As an alternative, the flowchart of FIG. 2B may be viewed as depicting an example of elements of a method implemented in the first secure element 165 or the second secure element 168 (FIG. 1A) according to one or more embodiments. Additionally, portions of the flowchart of FIG. 2B may also be executed in the first wallet application 171 or the second wallet application 181.

Beginning with box 230, the first payment application 175 can receive a request from the first wallet application 171 to generate a sub-payment token 134 (e.g., a sub-payment key 123). The request can include one or more key restrictions 178. For example, a key restriction 178 may include a quantity of permitted transactions for the sub-payment key 123. In some implementations, the first payment application 175 can authenticate the first wallet application 171 by validating credentials that are provided by the first wallet application 171. The authentication process can be a proprietary authentication process in some implementations. In other implementations, the authentication process can include a standard, such as the GlobalPlatform® Secure Channel Protocol or other suitable authentication protocols.

In box 233, the first payment application 175 can generate an application transaction counter (ATC) range for the sub-payment key 123. The ATC range can be generated based at least in part on the quantity of permitted transactions selected by the account holder. For example, if the sub-ATC of the sub-payment key 123 is at 0x0005 and three new transactions were requested, then the ATC range would be 0x0006-0x0008 for the sub-payment key 123.

In box 236, the first payment application 175 can generate the sub-payment key 123 based at least in part on the payment key 130 and the ATC range. In some implementations, the ATC range is a parameter that is added to the sub-payment key 123. For example, the sub-payment key 123 can be generated by adding an ATC range start value and an ATC range end value as a parameters to the the payment key 130. The ATC range start can represent a starting point of the ATC range, and the ATC range end can represent an ending point of the ATC range. Other key restrictions 178 can be added as parameters to the sub-payment key 123. For example, a transaction value limit, a period of time limit, a category transaction type restriction, and other potential restrictions can be added to the sub-payment key 123 as parameters.

In box 239, the first payment application 175 can add the ATC range used for the sub-payment key 123 to the issuer application data stored in the data store 118 of the computing environment 103. The ATC range can be used by the issuer when a payment key 130 is recalculated. For example, the ATC range can be useful when recalculating a memory location for the payment key 130, in order to prevent a new payment key 130 from being stored in a memory location allocated to the ATC range of a sub-payment key 123. It should be noted that the payment key 130 and other related payload data elements can remain the same, such as permanent account number (PAN), an expiry date, and other payload data element.

In box 242, the first payment application 175 can return the sub-payment token 134 comprising the sub-payment key 123 to the first wallet application 171. In some embodiments, the sub-payment token 134 is encrypted by the first payment application 175 using an encryption key stored in the first secure element 165. Then, the first payment application 175 can proceed to the end.

Figure 3A:
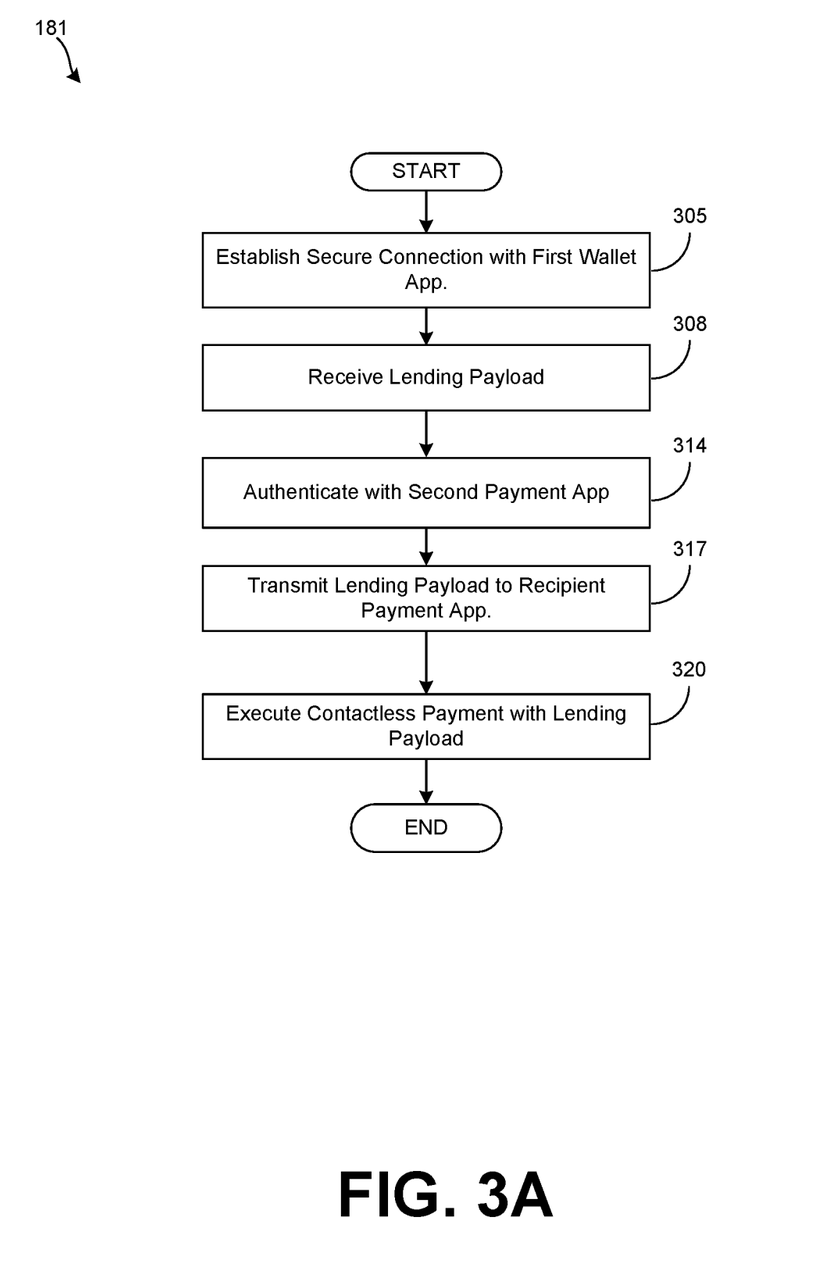
FIG. 3A is a flowchart illustrating one example of functionality implemented as portions of a second wallet application executed in a computing environment in the networked environment of FIG. 1A according to various embodiments of the present disclosure.

Turning now to FIG. 3A, shown is a flowchart that provides one example of the operation of a portion of the second wallet application 181 according to various embodiments. It is understood that the flowchart of FIG. 3A provides merely an example of the many different types of functional arrangements that may be employed to implement the operation of the portion of the second wallet application 181 as described herein. As an alternative, the flowchart of FIG. 3A may be viewed as depicting an example of elements of a method implemented in the second secure element 168 (FIG. 1A) according to one or more embodiments.

Beginning with box 305, the second wallet application 181 can establish a communication session with the first wallet application 171. The communication session can be a peer-to-peer wireless protocol, or other suitable wireless communications protocol. In some embodiments, the second wallet application 181 can display the second user interface 183 for prompting the second user to validate establishing a communication with session a first client device 106.

In box 308, the second wallet application 181 can receive the lending payload from the first wallet application 171 by a wireless communication session. After receiving the lending payload, the second wallet application 181 can select a second payment application 185 among various second payment applications 185 stored in the second secure element 168. The lending payload comprises the sub-payment token 134 and the sub-payment key 123.

In box 314, the second wallet application 181 can provide credentials to the second payment application 185 for authentication. The authentication process can be a proprietary authentication process in some implementations. In other implementations, the authentication process can include a standard, such as the GlobalPlatform® Secure Channel Protocol or other suitable authentication protocols. After authentication has been achieved, a secure session can be established between the second wallet application 181 and the second payment application 185 stored in the second secure element 168.

In box 317, the second wallet application 181 can transmit the lending payload to the second payment application 185 through the established secure session. The second payment application 185 can extract the sub-payment token 134 that comprises the sub-payment key 123 from the lending payload.

In box 320, the second wallet application 181 can used to execute a transaction. For example, a second user can be at a store in front a POS terminal that accepts payment information through NFC. The second user can select on the second client device 109 to use a sub-payment token 134 that is associated with the sub-payment key 123 stored in the second client device 109. As part of the payment process, the second client device 109 can provide the sub-payment key 123 to the POS terminal 112. The POS terminal 112 can forward the sub-payment key 123 and other transaction data to the issuer service 121 for approval. The issuer service 121 can approve of the transaction and notify the POS terminal 112. Then, the second wallet application 181 can proceed to the end.

Figure 3B:
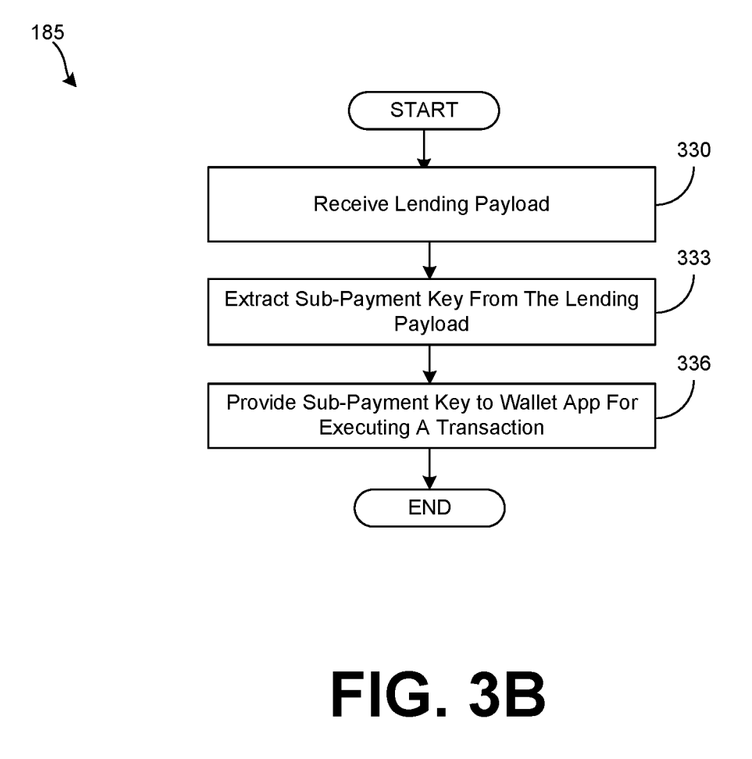
FIG. 3B is a flowchart illustrating one example of functionality implemented as portions of a second payment application executed in a computing environment in the networked environment of FIG. 1A according to various embodiments of the present disclosure.

Referring next to FIG. 3B, shown is a flowchart that provides one example of the operation of a portion of the second payment application 185 according to various embodiments. It is understood that the flowchart of FIG. 3B provides merely an example of the many different types of functional arrangements that may be employed to implement the operation of the portion of the second payment application 185 as described herein. As an alternative, the flowchart of FIG. 3B may be viewed as depicting an example of elements of a method implemented in the second secure element 168 (FIG. 1A) according to one or more embodiments.

Beginning with box 330, the second payment application 185 can receive a lending payload from the second wallet application 181. In some embodiments, the second payment application 185 can authenticate a session with the second wallet application 181. The authentication process may be a proprietary protocol or may be a standardized process or protocol, such as the GlobalPlatform® Secure Channel Protocol or other suitable protocols for authenticating access to an application executed in the second secure element 168.

In box 333, the second payment application 185 can extract the sub-payment token 134 and the sub-payment key 123 from the lending payload. The sub-payment key 123 can be stored in the second secure element 168. In some embodiments, the second payment application 185 can validate the lending payload using a cryptographic key. By validating, the lending payload can be decrypted to provide access to the sub-payment key 123.

In box 336, the second payment application 185 can provide access to the sub-payment key 123 when executing a transaction. For example, the second user of the second client device 109 may select to use the sub-payment token 134 associated with the sub-payment key 123. The second wallet application 181 can request the sub-payment key 123 and the second payment application 185 can provide the sub-payment key 123 to the second wallet application 181, in which the second wallet application 181 can use the sub-payment key 123 for completing a contactless purchase with a POS terminal 112. Then, the second payment application 185 can proceed to the end.

Figure 4:
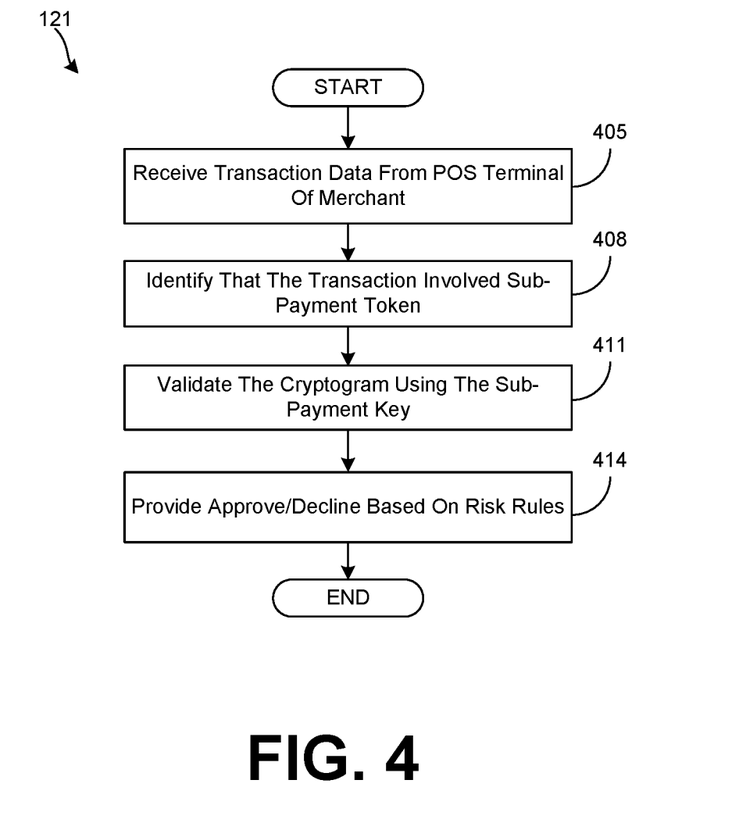
FIG. 4 is a flowchart illustrating one example of functionality implemented as portions of an issuer service executed in a computing environment in the networked environment of FIG. 1A according to various embodiments of the present disclosure.

Turning now to FIG. 4, shown is a flowchart that provides one example of the operation of a portion of the issuer service 121 according to various embodiments. It is understood that the flowchart of FIG. 4 provides merely an example of the many different types of functional arrangements that may be employed to implement the operation of the portion of the issuer service 121 as described herein. As an alternative, the flowchart of FIG. 4 may be viewed as depicting an example of elements of a method implemented in the computing environment 103 (FIG. 1A) according to one or more embodiments.

Beginning with box 405, the issuer service 121 can receive transaction data from a POS terminal 112 of a merchant. In a non-limiting example, the transaction data can be generated by the POS terminal 112 that executed a contactless payment with the second client device 109. The transaction data can include the sub-payment token 134, the sub-payment key 123, the transaction amount, and other transaction data.

In box 408, the issuer service 121 can identify that the transaction data is associated with a sub-transaction 136 based on the sub-payment key 123 and the other key restrictions 178. In some examples, the issuer service 121 can distinguish in a financial report transactions 133 from the sub-transactions 136 for the account holder of the user account 124. The financial report can be used by the account holder to see the sub-transactions 136 that were completed with the sub-payment token 134 that was provided to the other individual. The sub-transactions 136 will be the responsibility of the account holder of the user account 124 to pay. The transaction data can include an application cryptogram that was generated by the second client device 109 during a transaction by signing data elements.

In box 411, the issuer service 121 can validate the application cryptogram using the sub-payment key 123. The application cryptogram can be validated by deriving the sub-payment key 123 using a cryptographic operation.

In box 414, the issuer service 121 can determine whether to approve or decline the sub-transaction 136 based on the risk rules. In some embodiments, the risk rules include checking the key restrictions 178. For example, the issuer service 121 can verify whether the sub-payment key 123 has exceeded a quantity of permitted sub-transactions 136 based at least in part on the sub-ATC and the ATC range. For instance, if the sub-ATC is beyond the ATC range, the issuer service 121 can deny the sub-transaction 136.

In other examples, the issuer service 121 can compare the transaction data with the key restrictions 178. For instance, the transaction data can indicate the sub-transaction 136 is for a retail purchase and the key restriction 178 indicates that the sub-payment key 123 is restricted to education-related purchases. As a result, in this example, the issuer service 121 can instruct the POS terminal 112 to decline the transaction. Also, the risk rules can include rules for assessing potential fraud. Then, the issuer service 121 can proceed to the end.

Figure 5:
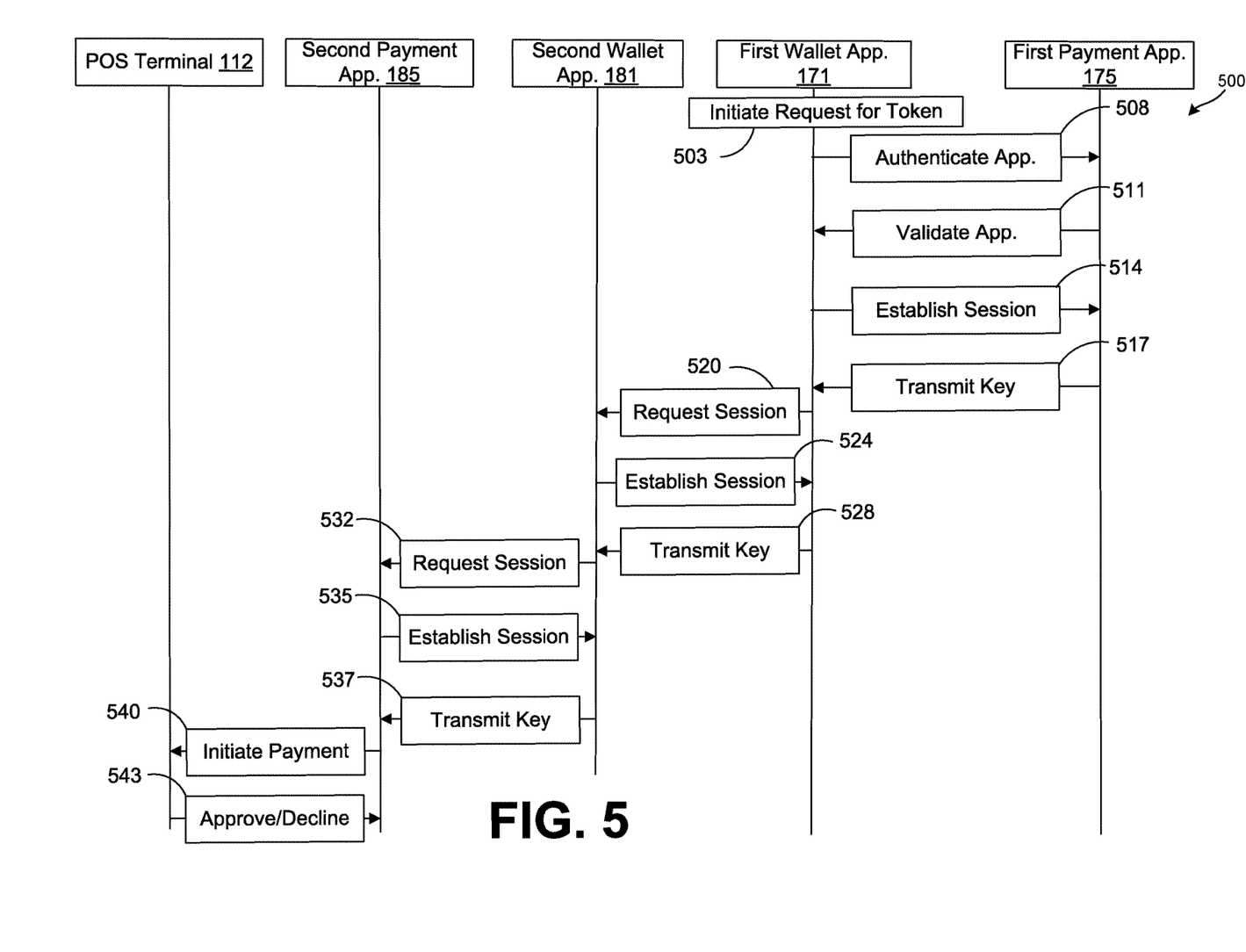
FIG. 5 is a sequence diagram illustrating an example of the interactions between the various components of the network environment of FIG. 1A according to various embodiments of the present disclosure.

Next, moving to FIG. 5, shown is a sequence diagram 500 of operations performed in the networked environment 100. The sequence diagram 500 can represent an alternative embodiment from FIGS. 2A and 2B. The sequence diagram 500 relates to an account holder generating a sub-payment token 134 and a sub-payment key 123 and providing the them to a second user according to various embodiments. In an alternative embodiment, the sequence diagram 500 can represent a method of operations implemented in the networked environment 100.

To begin, at block 503, the first wallet application 171 can display a first user interface 173 that allows a first user (e.g., an account holder of a user account 124) to select a user interface component to issue a sub-payment token 134, which will be subordinated to a payment token 127 (e.g., credit, charge, debit, or gift card) for the user account 124. On the first user interface 173, the first user can select a quantity of permitted transactions for the sub-payment token 134 for a second user. The first user interface 173 can also be used to receive other key restrictions 178.

At block 508, the first wallet application 171 can select a first payment application 175 to generate a sub-payment key 123 for the sub-payment token 134. After the first payment application 175 has been selected, the first wallet application 171 can provide credentials for authenticating a session with the first payment application 175. In some embodiments, the authentication between the first wallet application 171 and first payment application 175 can be implemented according to the GlobalPlatform® Secure Channel Protocol standard or other suitable protocols.

At block 511, the first payment application 175 can validate the credentials of the first wallet application 171. The first payment application 175 can transmit a success/failure message with regard to the authentication of the credentials. In some instances, the functionality at block 508 and 511 can be omitted.

At block 514, after receiving a successful authentication message, the first wallet application 171 can establish a session with the first payment application 175. The first payment application 175 can transmit a successful/failure message to the first wallet application 171. Then, the first wallet application 171 can transmit a request for a sub-payment key 123 to the first payment application 175. The request can include the quantity of permitted transactions and other key restrictions 178. After receiving the request, the first payment application 175 can validate the request and determine if it has the sufficient access to generate the sub-payment key 123. For example, the first payment application 175 can determine if it has access to the needed data elements (e.g., the payment key 130).

Then, the first payment application 175 can generate a sub-payment key 123 based at least in part on the payment key 130. In some implementations, the sub-payment key 123 is also generated based at least in part on a generated ATC range and an initial value for a sub-ATC. The first payment application 175 can also accumulate other transaction specific details, such as Application Interchange Profile (AIP), Application File Locator (AFL), Processing Options Data Object List (PDOL), Card Risk Management Data Object List 1, and potential other EMV related data. Further, the first payment application 175 can add the ATC range to the issuer application data, so that during authorization the issuer service 121 can recalculate the payment key 130 based on the ATC range.

At block 517, the first payment application 175 can transmit the sub-payment key 123 to the first payment application 171. In some embodiments, prior to transmitting the sub-payment key 123, the first payment application 175 can personalize a template associated with the sub-payment key 123 and can encrypt the sub-payment key 123.

At block 520, the first wallet application 171 can transmit a request establishing a session with the second wallet application 181. The first wallet application 171 can communicate with the second wallet application 181 a peer-to-peer communication protocol (e.g., Bluetooth, NFC, etc.), by way of the network 115, or by other means of data communication.

In some embodiments, the first wallet application 171 can transmit the request based at least in part on a selected contact from a contact list, user-specified device information (e.g., phone number, email address), and other suitable identification for a client device. In other embodiments, the first wallet application 171 can use a peer-to-peer communication protocol or the network 115 to identify the second client device 109.

At block 524, the second wallet application 181 can transmit a success/failure message to the first wallet application 171 for establishing the session between the first wallet application 171 and the second wallet application 181. In some embodiments, the second wallet application 181 can receive from the first wallet application 171 a credential for validating the identity of the first wallet application 171.

At block 528, the first wallet application 171 can transmit the sub-payment token 134 to the second wallet application 181. The sub-payment token 134 can include the sub-payment key 123.

At block 532, the second wallet application 181 can select a second payment application 185 to transmit the sub-payment token 134. After selecting the second payment application 185, the second wallet application 181 can transmit a credential for authentication. The authentication process can be a proprietary authentication process in some implementations. In other implementations, the authentication process can include a standard, such as the GlobalPlatform® Secure Channel Protocol or other suitable authentication protocols.

At block 535, the second payment application 185 can transmit a success/failure message to the second wallet application 181. In some embodiments, the second payment application 185 can receive a request from the second wallet application 181 associated with receiving the sub-payment token 134. The second wallet application 181 can validate the request in order to ensure that it has the appropriate access control for unpacking and/or storing the sub-payment token 134.

At block 537, the second wallet application 181 can transmit the sub-payment token 134 to the second payment application 185. In some embodiments, the second payment application 185 can unwrap the sub-payment token 134 and store the sub-payment key 123 in the second secure element 168.

At block 540, the second user can be at a physical store and in front of the POS terminal 112 that has a contactless payment capability. The second payment application 185 can facilitate a contactless payment by providing the sub-payment token 134 to the POS terminal 112.

At block 543, the POS terminal 112 could provide a success/failure message to indicate whether the transaction had been completed. In some embodiments, the POS terminal 112 can request a transaction approval from the Issuer service 121. The issuer service 121 can identify the sub-payment key 123 and enforce the key restriction 178. For example, the issuer service 121 can determine if the sub-ATC was beyond the ATC operating range. Thus, the issuer service 121 can determine if there were any remaining permitted transactions for the sub-payment key 123.

As another example, the issuer service 121 can compare the transaction data to the other key restrictions 178. For instance, a key restriction 178 could be set for a transaction value to not exceed $150 dollar value. If the transaction data indicated that the transaction is for $75, then this key restriction 178 is satisfied. After reviewing all of the key restrictions 178 and other risk factors, the issuer service 121 can transmit a transaction approval message to the POS terminal 112. Then, the sequence diagram 500 can proceed to the end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagram of FIGS. 2A, 2B, 3A, 3B, 4 and 5 represent the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagram of FIGS. 2A, 2B, 3A, 3B, 4 and 5 follow a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagram of FIGS. 2A, 2B and 5 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, and/or Z, or any combination thereof (e.g., X; Y; Z; X and/or Y; X and/or Z; Y and/or Z; X, Y, and/or Z, etc.). Thus, such disjunctive language is not generally intended to, and should not, imply that certain embodiments require at least one of X, at least one of Y, and/or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor, a memory, and a secure element, the secure element being a tamper-resistant hardware component that is configured to execute a restricted application; and
machine-readable instructions stored in the memory that, when executed by the processor, cause the computing device to at least:
receive an indication for generating a sub-payment token that is subordinate to a payment token stored on the computing device, the payment token having a first application transaction counter range;
receive a selection of a key restriction for the sub-payment token;
execute the restricted application in the secure element to generate the sub-payment token based at least in part on the key restriction, the sub-payment token comprising a sub-payment key and a second application transaction counter range, wherein the second application transaction counter range is restricted by the first application transaction counter range;
receive from the restricted application the sub-payment token;
establish a wireless communication session with a client device; and
send the sub-payment token through the wireless communication session to a wallet application of the client device.

2. The system of claim 1, wherein the key restriction comprises at least one of a category restriction parameter, a single transaction limit restriction parameter, or a date restriction parameter.

3. The system of claim 1, wherein the wallet application is a second wallet application, and the machine-readable instructions, when executed by the processor, cause the computing device to at least:
display a user interface for a first wallet application on the computing device, the user interface being configured to receive the selection of the key restriction.

4. The system of claim 1, wherein sending the sub-payment token to the wallet application of the client device further causes the computing device to at least:
secure the sub-payment token using an encryption key stored in the secure element.

5. The system of claim 1, wherein sending the sub-payment token to the wallet application of the client device comprises using a peer-to-peer messaging protocol.

6. The system of claim 1, wherein the secure element is a processor component.

7. A method, comprising:
receiving, via a first mobile device that comprises a secure hardware element, an indication for generating a sub-payment token that is subordinate to a payment token stored on the first mobile device, the payment token having a first application transaction counter range;
receiving, via the first mobile device, a selection of a key restriction for the sub-payment token;
executing, via the first mobile device, a restricted application in the secure hardware element to generate the sub-payment token based on the key restriction, the sub-payment token comprising a sub-payment key and a second application transaction counter range, wherein the second application transaction counter range is restricted by the first application transaction counter range;
receiving, via the first mobile device, from the restricted application the sub-payment token;
establishing, via the first mobile device, a wireless communication session with a second mobile device; and
sending, via the first mobile device, the sub-payment token through the wireless communication session to a wallet application of the second mobile device.

8. The method of claim 7, wherein the key restriction comprises at least one of a category restriction parameter, a single transaction limit restriction parameter, or a date restriction parameter.

9. The method of claim 7, wherein the second application transaction counter range is based at least in part on a quantity of transactions permitted for the sub-payment token.

10. The method of claim 7, wherein the wallet application is a second wallet application, and the method further comprising:

displaying, via the first mobile device, a user interface for a first wallet application on the first mobile device, the user interface being configured to receive the selection of the key restriction.

11. The method of claim 7, wherein sending the sub-payment token to the wallet application of the second mobile device further comprising:
    securing, via the first mobile device, the sub-payment token using an encryption key stored in the secure hardware element.

12. The method of claim 7, wherein sending the sub-payment token to the wallet application of the second mobile device comprises using a peer-to-peer messaging protocol.

13. The method of claim 7, wherein the secure hardware element is tamper-resistant and the secure hardware element comprises a processor and a memory, wherein the memory stores the restricted application.

14. A non-transitory computer-readable medium embodying machine-executable instructions stored thereon that, when executed by a processor of a computing device, cause the computing device to at least:
    receive an indication for generating a sub-payment token that is subordinate to a payment token stored on the computing device, wherein the computing device comprises a secure hardware element, the payment token having a first application transaction counter range;
    receive a selection of a key restriction for the sub-payment token;
    execute a restricted application in the secure hardware element to generate the sub-payment token based on the key restriction, the sub-payment token comprising a sub-payment key and a second application transaction counter range, wherein the second application transaction counter range is restricted by the first application transaction counter range;
    receive from the restricted application the sub-payment token;
    establish a wireless communication session with a client device; and
    send the sub-payment token through the wireless communication session to a wallet application of the client device.

15. The non-transitory computer-readable medium of claim 14, wherein the key restriction comprises at least one of a category restriction parameter, a single transaction limit restriction parameter, or a date restriction parameter.

16. The non-transitory computer-readable medium of claim 14, wherein the second application transaction counter range is based at least in part on a quantity of transactions permitted for the sub-payment token.

17. The non-transitory computer-readable medium of claim 14, wherein the machine-executable instructions, when executed by the processor, cause the computing device to at least:
    display a user interface for a first wallet application on the computing device, the user interface being configured to receive the selection of the key restriction.

18. The non-transitory computer-readable medium of claim 14, wherein sending the sub-payment token to the wallet application of the client device further causes the computing device to at least:
    secure the sub-payment token using an encryption key stored in the secure hardware element.

19. The non-transitory computer-readable medium of claim 14, wherein the secure hardware element comprises a processor and a memory, wherein the restricted application is stored in the memory.

20. The system of claim 1, wherein the sub-payment key is an account specific secret key.

* * * * *